US009654440B1

(12) United States Patent
Nehme Antoun et al.

(10) Patent No.: US 9,654,440 B1
(45) Date of Patent: May 16, 2017

(54) MODIFICATION OF DOMAIN NAME SYSTEMS USING SESSION INITIATION PROTOCOL MESSAGES

(71) Applicant: Sprint Communications Company L.P., Overland Park, KS (US)

(72) Inventors: Nicolas A. Nehme Antoun, Olathe, KS (US); Youssef Salim Rouphael, Olathe, KS (US); Jeffery O. Green, Lee's Summit, MO (US); Trey A. Hilyard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 242 days.

(21) Appl. No.: 14/200,495

(22) Filed: Mar. 7, 2014

(51) Int. Cl.
*G06F 15/16* (2006.01)
*H04L 29/12* (2006.01)
*H04L 29/06* (2006.01)

(52) U.S. Cl.
CPC ...... *H04L 61/1511* (2013.01); *H04L 65/1006* (2013.01)

(58) Field of Classification Search
CPC ........... H04L 61/1511; H04L 29/12066; H04L 65/1006; H04L 29/12301; H04W 4/12; H04W 60/00; H04W 8/20; H04W 8/26; H04W 76/022
USPC ........ 709/202, 205, 206, 207, 221, 225, 228
See application file for complete search history.

(56) References Cited

U.S. PATENT DOCUMENTS

| 7,929,419 | B2 | 4/2011 | Sprague |
| 8,064,342 | B2 | 11/2011 | Badger |
| 8,284,661 | B2 | 10/2012 | Badger |
| 8,392,581 | B2 | 3/2013 | Ait-Ameur et al. |
| 8,437,254 | B2 | 5/2013 | O'Sullivan et al. |
| 8,442,526 | B1 * | 5/2013 | Bertz ................. H04L 65/1016 455/433 |
| 2007/0153813 | A1 | 7/2007 | Terpstra et al. |
| 2008/0062997 | A1 * | 3/2008 | Nix ................... H04L 29/12066 370/395.2 |
| 2008/0280623 | A1 | 11/2008 | Danne et al. |
| 2010/0145963 | A1 * | 6/2010 | Morris .............. H04L 29/12066 707/758 |

* cited by examiner

*Primary Examiner* — Ruolei Zong

(57) ABSTRACT

A communication server to facilitate modification of records in a domain name system (DNS) server comprises a session initiation protocol (SIP) network interface, a DNS network interface, and a processing system. The SIP network interface is configured to receive a SIP information message comprising a DNS modification indicator. The processing system is configured to, responsive to the DNS modification indicator, process the SIP information message to identify DNS modification parameters in the SIP information message, and process the DNS modification parameters to generate a DNS modification command for the DNS server. The DNS network interface is configured to transfer the DNS modification command for delivery to the DNS server.

17 Claims, 5 Drawing Sheets

MODIFICATION OF DOMAIN NAME SYSTEMS USING SESSION INITIATION PROTOCOL MESSAGES

TECHNICAL BACKGROUND

Users of communication networks commonly engage in multimedia communication sessions, such as streaming video, voice over internet protocol (VoIP) calls, and other multimedia applications. The session initiation protocol (SIP) is typically used for controlling communication sessions consisting of one or more multimedia streams. Generally, SIP defines the messages that are sent between peers which control establishing, modifying and terminating multimedia sessions. In some examples, an IP multimedia subsystem (IMS) may be employed that supports streaming media sessions and other types of communication services. IMS typically utilizes SIP to facilitate communication session setup and tear-down to enable delivery of real-time IP multimedia services to communication devices operated by users requesting these services.

In a SIP peering environment, SIP links or pools of links may be established between operators of different domains based on operator-defined routing logic. These SIP links are typically identified by domain names and provisioned as service (SRV) records in a domain name system (DNS) server with the appropriate weights and priorities for optimal traffic distribution. Once a SIP link is established between peers, an operator can utilize the link to establish communication sessions and send traffic that requires termination in a different domain controlled by the other operator, without having to transfer the data indirectly over the internet or other, less reliable communication networks.

OVERVIEW

A method of operating a communication server to facilitate modification of records in a domain name system (DNS) server is disclosed. The method comprises receiving a session initiation protocol (SIP) information message comprising a DNS modification indicator. The method further comprises, responsive to the DNS modification indicator, processing the SIP information message to identify DNS modification parameters in the SIP information message. The method further comprises processing the DNS modification parameters to generate a DNS modification command for the DNS server. The method further comprises transferring the DNS modification command for delivery to the DNS server.

A communication server to facilitate modification of records in a domain name system (DNS) server comprises a session initiation protocol (SIP) network interface, a DNS network interface, and a processing system. The SIP network interface is configured to receive a SIP information message comprising a DNS modification indicator. The processing system is configured to, responsive to the DNS modification indicator, process the SIP information message to identify DNS modification parameters in the SIP information message, and process the DNS modification parameters to generate a DNS modification command for the DNS server. The DNS network interface is configured to transfer the DNS modification command for delivery to the DNS server.

A computer apparatus to facilitate modification of records in a domain name system (DNS) server comprises software instructions and at least one non-transitory computer-readable storage medium storing the software instructions. The software instructions are configured, when executed by a communication server, to direct the communication server to receive a session initiation protocol (SIP) information message comprising a DNS modification indicator and, responsive to the DNS modification indicator, process the SIP information message to identify DNS modification parameters in the SIP information message. The software instructions are further configured to direct the communication server to process the DNS modification parameters to generate a DNS modification command for the DNS server, and transfer the DNS modification command for delivery to the DNS server.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
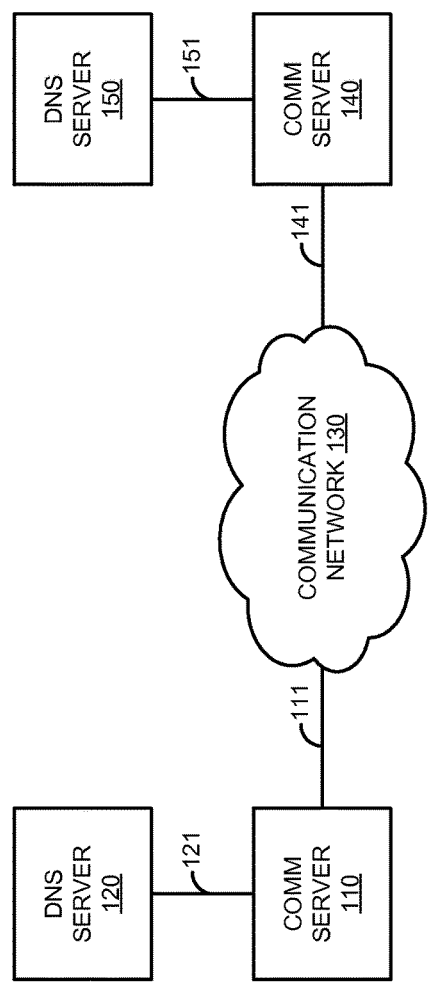
FIG. 1 is a block diagram that illustrates a communication system.

FIG. 1 is a block diagram that illustrates communication system 100. Communication system 100 includes communication servers 110 and 140, communication network 130, and domain name system (DNS) servers 120 and 150. Communication server 110 and communication network 130 are in communication over communication link 111, while communication server 110 and DNS server 120 communicate over communication link 121. Likewise, communication network 130 and communication server 140 are in communication over communication link 141, and communication server 140 and DNS server 150 communicate over communication link 151.

Figure 2:
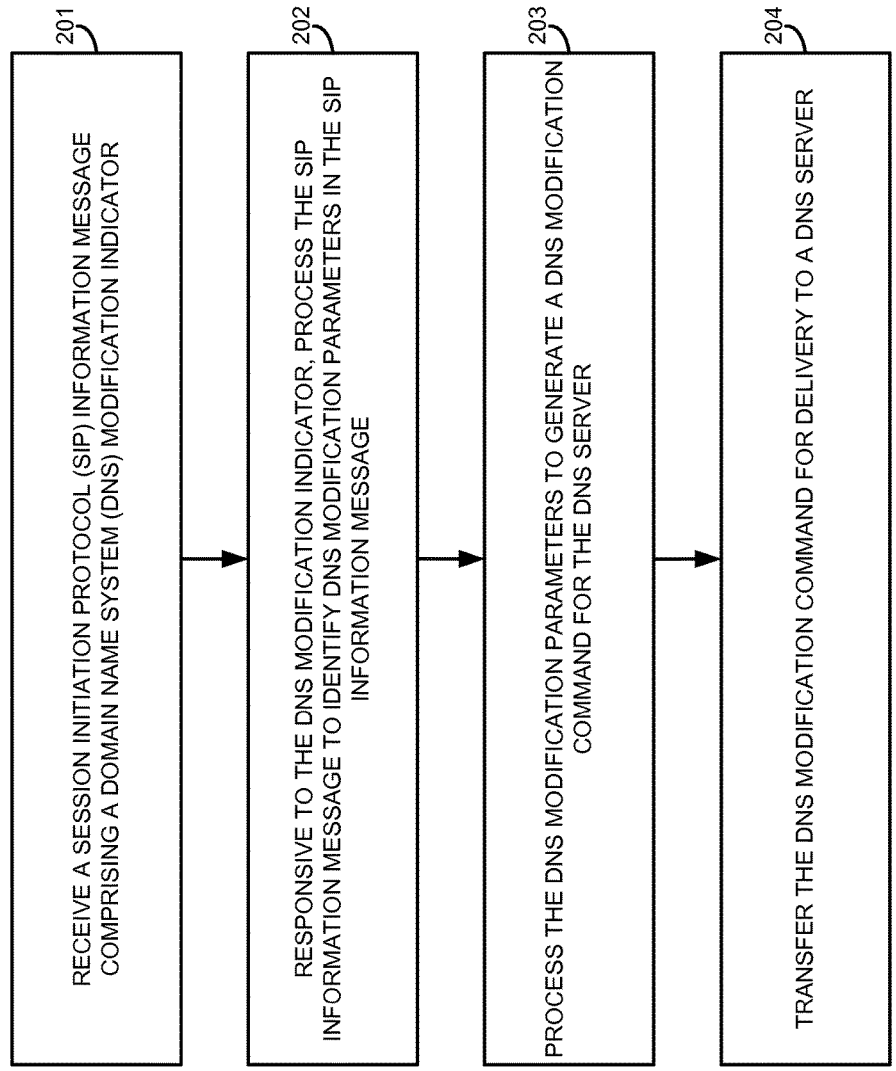
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed to facilitate modification of records in a domain name system (DNS) server. For purposes of this example, the operation of FIG. 2 will be described with respect to communication server 110 and DNS server 120.

As shown in the operational flow of FIG. 2, communication server 110 receives a session initiation protocol (SIP) information message comprising a DNS modification indicator (201). The DNS modification indicator informs communication server 110 that the SIP information message is intended to perform some operation on DNS server 120, such as a DNS update. In some examples, the DNS modification indicator could comprise a DNS update header included in a header of the SIP information message. The SIP information message typically identifies at least one DNS entry by name and/or IP address, and includes a number of DNS modification parameters associated therewith. In some examples, the DNS modification parameters could be included in an extensible markup language (XML) body of the SIP information message.

Responsive to the DNS modification indicator, communication server 110 processes the SIP information message to identify the DNS modification parameters in the SIP information message (202). Typically, communication server 110 would recognize the DNS modification indicator in the SIP information message, triggering communication server 110 to process the SIP information message and extract the DNS modification parameters. The DNS modification parameters commonly identify at least one DNS entry by name and/or IP address along with some action to take with respect to DNS server 120. In some examples, the DNS modification parameters could include a link pool name, link IP address, port, transport, application protocol, link name, link priority, weight, action to take, reason for the action, and any other information that may be used by communication server 110 to make changes to DNS server 120. For example, the DNS modification parameters could comprise an IP address of a SIP trunk link that has become overloaded, along with an updated weight and link priority that would lower the probability of selecting this link.

Communication server 110 processes the DNS modification parameters to generate a DNS modification command for DNS server 120 (203). Communication server 110 generates the DNS modification command using information included in the DNS modification parameters, which typically identify at least one link and instructions to add or remove the link, or modify some attributes associated with the link. Communication server 110 thus creates a DNS modification command that may be processed and understood by DNS server 120.

Communication server 110 transfers the DNS modification command for delivery to DNS server 120 (204). As discussed above, the DNS modification command typically provides instructions to DNS server 120 to add, remove, or modify a link and/or properties of the link. For example, upon receipt of the DNS modification command, DNS server 120 could be configured to process the DNS modification command to modify at least one DNS record, which would be modified according to the DNS modification parameters received by communication server 110 in the SIP information message.

In some examples, communication server 110 and DNS server 120 could be associated with a first domain, and communication server 140 and DNS server 150 could be associated with a second domain. In such a scenario, communication server 110 might receive a SIP information message transmitted from communication server 140 in the second domain. For example, communication server 140 could populate the SIP information message with DNS modification parameters in order to make changes to DNS server 120 in the first domain using the techniques disclosed herein. In addition, note that communication server 110 in the first domain could generate a second SIP information message comprising a DNS update for DNS server 150 associated with the second domain, and could transfer this second SIP information message for delivery to communication server 140 in order to make the changes to DNS server 150 in the second domain.

Advantageously, communication server 110 receives a SIP information message having DNS modification parameters and generates a DNS modification command to effectuate changes to DNS server 120 according to the SIP information message. By providing DNS server 120 with the DNS modification command, new DNS entries may be created, old DNS entries may be removed, and existing DNS entries may be modified according to the DNS modification parameters received in the SIP information message. In this manner, changes in link status, such as overloaded, out-of-service, high latency, and the like, can be immediately communicated between nodes and the corresponding DNS records automatically updated without manual operator intervention. Additionally, by removing outdated links and/or updating the weight and priority of overloaded or out-of-service links, less traffic will be routed over these links, thereby reducing failures and delays in establishing connections, along with eliminating the need to quarantine problem links after failures are observed.

Referring back to FIG. 1, communication servers 110 and 140 each individually comprise a processing system and communication transceiver. Communication servers 110 and 140 may also include other components such as a router, server, data storage system, and power supply. Communication servers 110 and 140 may individually reside in single devices or may be distributed across multiple devices. Communication servers 110 and 140 may each be a discrete system or may be integrated within other systems—including other systems within communication system 100. In some examples, communication servers 110 and 140 could comprise a session initiation protocol (SIP) server, voice over internet protocol (VoIP) gateway, VoIP control switch, softswitch, authentication, authorization, and accounting (AAA) server, home agent, packet data serving node (PDSN), network switch, mobile switching center, router, switching system, packet gateway, network gateway system, Internet access node, application server, service node, firewall, or some other communication system—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

DNS servers 120 and 150 each individually comprise a processing system and communication transceiver. DNS servers 120 and 150 may also include other components such as a router, server, data storage system, and power supply. DNS servers 120 and 150 may individually reside in single devices or may be distributed across multiple devices. DNS servers 120 and 150 may each be a discrete system or may be integrated within other systems—including other systems within communication system 100. In some examples, DNS servers 120 and 150 could comprise a database system, SIP server, VoIP gateway, VoIP control switch, softswitch, AAA server, home agent, PDSN, network switch, mobile switching center, router, switching system, packet gateway, network gateway system, Internet access node, application server, service node, firewall, or some other communication system—including combinations thereof.

Communication links 111, 121, 141, and 151 use metal, air, space, optical fiber such as glass or plastic, or some other material as the transport media—including combinations thereof. Communication links 111, 121, 141, and 151 could use various communication protocols, such as TDM, IP, Ethernet, telephony, optical networking, hybrid fiber coax (HFC), communication signaling, wireless protocols, or some other communication format—including combinations thereof. Communication links 111, 121, 141, and 151 may be direct links or could include intermediate networks, systems, or devices.

Figure 3:
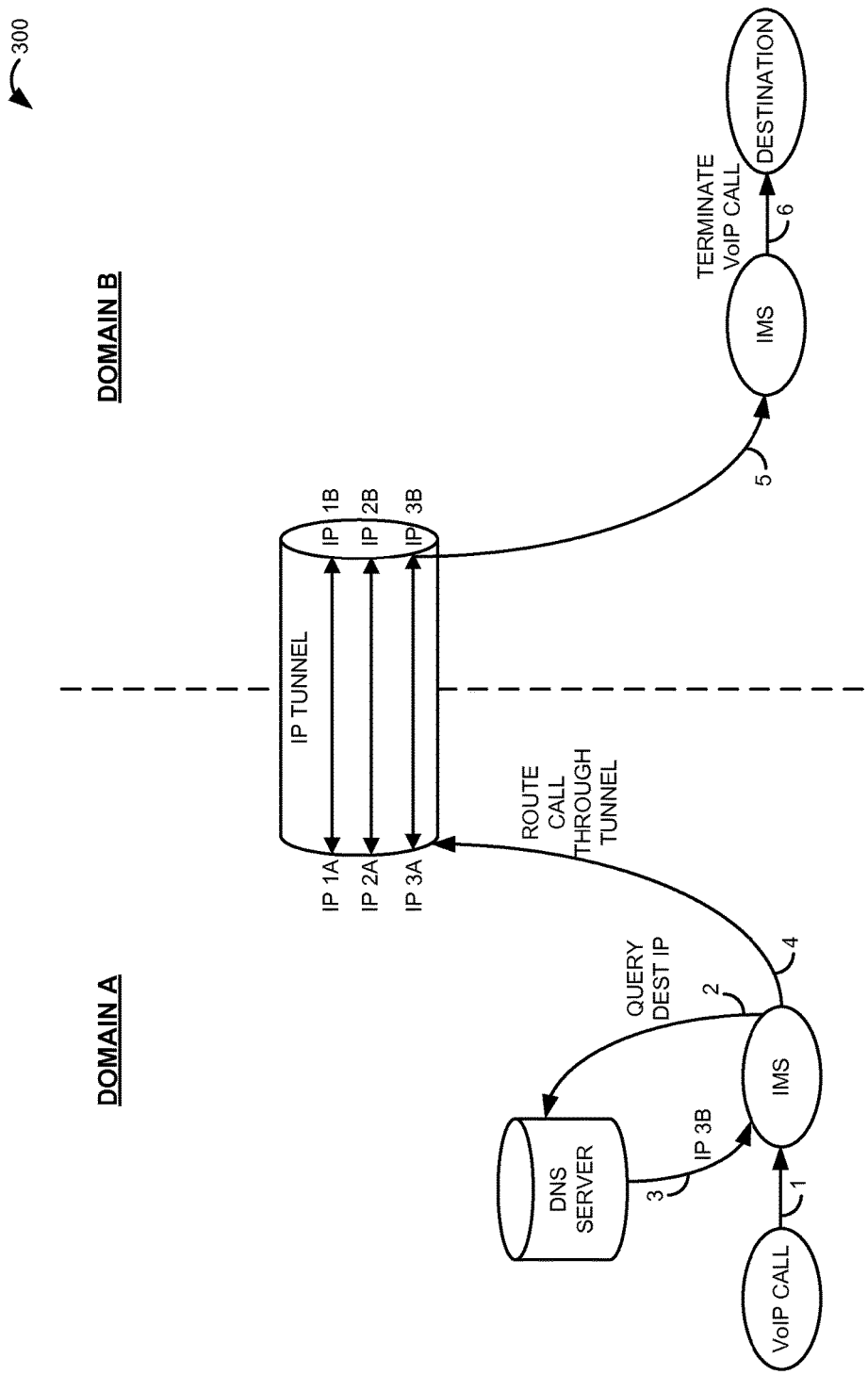
FIG. 3 is a block diagram that illustrates an operation of a communication system in an exemplary embodiment.

FIG. 3 is a block diagram that illustrates an operation of communication system 300 in an exemplary embodiment. In this example, communication system 300 is separated into two different domains, defined by the vertical dashed line in FIG. 3 and labeled "Domain A" and "Domain B", which represent distinct realms of administrative authority on the internet. For example, domains A and B could be operated by two separate and independent communication service providers. Each domain includes an IP multimedia subsystem (IMS) core network for delivering IP multimedia services.

In this example, a SIP peering environment is created between the two domains by way of an IP tunnel. The IP tunnel of communication system 300 is established by a plurality of SIP trunk links or pools of links between operators of domains A and B. Typically, the links that form the IP tunnel are based on operator-defined routing logic, such as least cost routing. The SIP links are identified by domain names and provisioned as service (SRV) records in a DNS server with the appropriate weights and priorities for traffic distribution. The SIP links provide a fast, peer-to-peer network connection between domains A and B through the IP tunnel, as opposed to routing traffic between the domains over the internet which is less efficient. Each of the SIP trunk links are defined by IP addresses at either end of the IP tunnel. In this example, the SIP links are defined by IPs 1A, 2A, and 3A in domain A, and 1B, 2B, and 3B in domain B.

In operation, a VoIP call is originated by a user in domain A. As shown by the numerical designations of 1 through 6 on the arrows defining the operational flow in FIG. 3, the VoIP call is first routed to the IMS core network in domain A. A VoIP gateway, VoIP control switch, and/or other network elements in the IMS core network process the VoIP call to identify call signaling that indicates the VoIP call is directed to a destination device associated with domain B. In order to determine which SIP trunk in the IP tunnel to use for transferring the call over to domain B, a query is sent to the DNS server in domain A. The DNS server in domain A contains DNS SRV records that identify SIP links by domain name for domain B, among others. The DNS server responds to the query for a SIP link in domain B with information needed to route the VoIP call to its destination in domain B, such as the link IP address and port. In this example, the DNS server returns destination IP address 3B, which may have been selected based on a weight and priority of the link associated with IP 3B relative to the weights and priorities of other possible links to domain B, such as those links defined by IP addresses 1B and 2B, for example.

Once the DNS server returns the appropriate SIP link information, the VoIP call is routed through the IP tunnel using the link defined by IP 3B to access domain B directly, instead of routing the call indirectly over the internet. Once the call is routed into domain B, the IMS core network in domain B receives the call. The VoIP call is then terminated to the appropriate destination device by VoIP control systems and/or other network equipment in domain B. Under this typical call setup scenario, the VoIP call is established faster and with greater reliability than without using the SIP trunk links through the IP tunnel between domains. However, if one of the links becomes overloaded or becomes unavailable, the call setup process may be delayed or even fail completely. To address this problem, an exemplary scenario of how a SIP server may update DNS SRV records in the DNS server will now be described with respect to FIG. 4.

Figure 4:
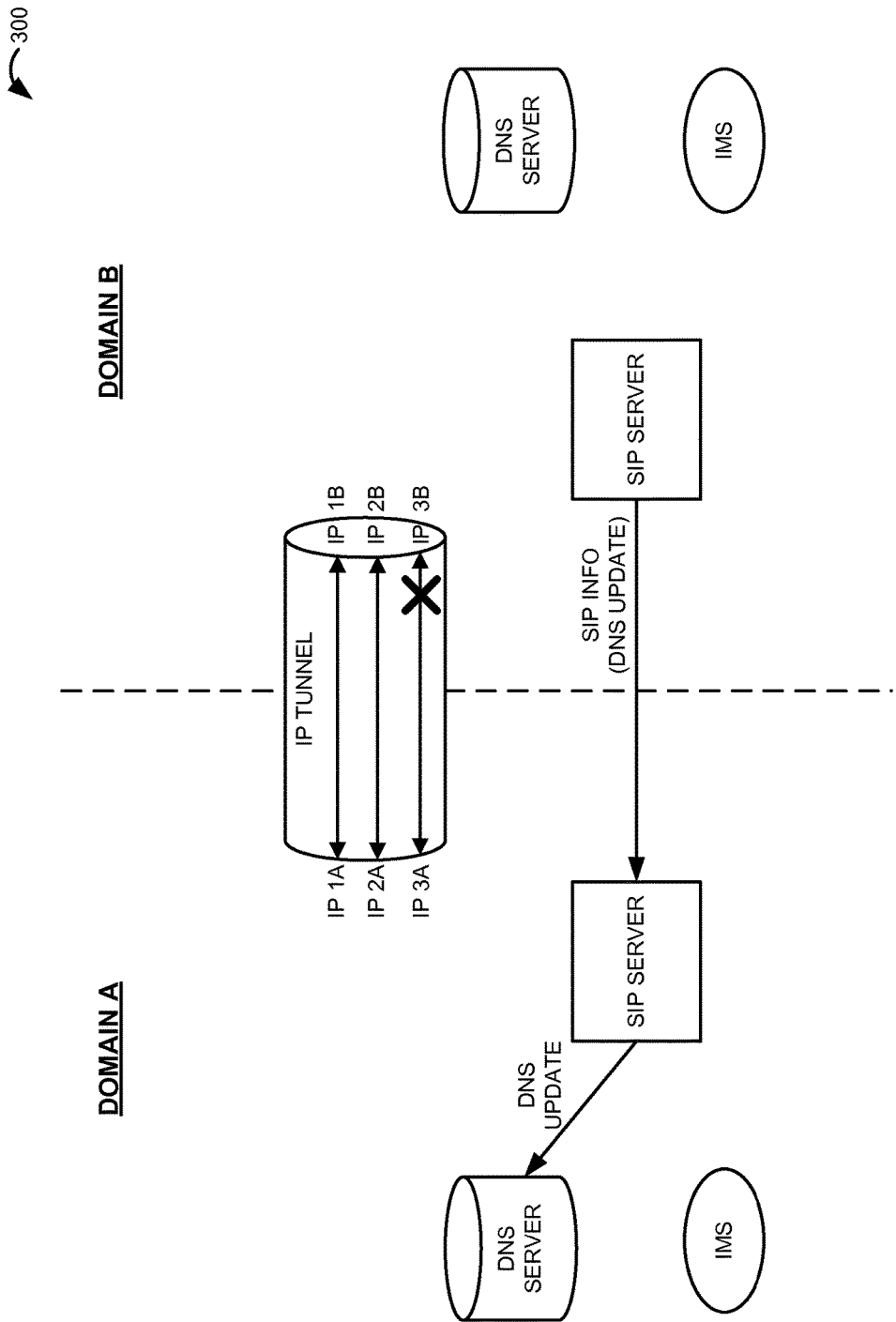
FIG. 4 is a block diagram that illustrates an operation of a communication system in an exemplary embodiment.

FIG. 4 is a block diagram that illustrates an operation of communication system 300 in an exemplary embodiment. This scenario demonstrates how a SIP server in domain B can effectuate changes to the DNS server in domain A. This could occur, for example, when network operators of domain B desire to add, remove, or update SIP link information in the DNS server in domain A. Any such changes need to be communicated between operators of these domains so the corresponding DNS SRV records are updated accordingly.

In this example, the SIP trunk link that terminates in domain B at IP 3B has been deactivated and put out-of-service, as shown by the large X appearing on this link. Operators of domain B need to communicate to operators of domain A that the SIP trunk link defined by IP 3B is no longer in service, so that network elements in domain A do not attempt to use this link to transfer communications into domain B. Historically, operators of domain B would manually inform operators of domain A about the link deactivation, such as by calling or sending a message to the operators of domain A with instructions to update the DNS server.

However, in this example, when the SIP link is deactivated on the SIP server in domain B that connects to another operator in domain A, the SIP server sends a SIP INFO message to the SIP server on the other end in domain A. A DNS update for the DNS server in domain A is included in an XML body of the SIP INFO message. The DNS update comprises DNS modification instructions associated with a link name, link pool name, link IP address, port, transport, application protocol, weight, and priority. The SIP server in domain A receives the SIP INFO message and uses the information in the DNS update to remove the communication link internally. To remove the deactivated link, the SIP server in domain A processes the SIP INFO message to generate a DNS update command and sends this command to its local DNS server. The DNS server in domain A then updates the corresponding link pool with the information received in the SIP INFO message. The SIP server in domain A may then reply to the SIP server in domain B with a 200 OK message in the case of successfully applying the update, or a SIP error message in the case of failure to update. This technique will facilitate updating existing link pools or the creation of new pools by one operator and automatically propagating the corresponding changes to a second operator in a different network or domain based on a pre-existing trust relationship. In addition, note that the SIP server in domain A could utilize the same technique to update DNS SRV records associated with SIP links of domain A stored in the DNS server of domain B.

In another exemplary operational scenario, a SIP link associated with domain B might become overloaded or go out of service temporarily. In this case, the SIP server in domain B sends a SIP INFO message with an XML body including the link name, pool name, link IP, port, transport protocol, application protocol, reason (such as "overloaded" or "out-of-service"), and an updated weight and priority. The updated weight and priority could be set to a minimum value, which would lower the probability of selecting the overloaded link. The receiving SIP server in domain A sends a DNS update command to the DNS server for the pool and link identified in the SIP INFO message and updates the weight and priority as indicated. Once the link status changes, such as the communication loading on the link has been reduced or the link is back in service, the SIP server in domain B sends another SIP INFO message with an XML body having the link name, pool name, link IP, port, transport, application protocol, reason (such as "overloading resolved" or "back in service"), and an updated weight and priority. The updated weight and priority could be set to the same or a similar value that was formerly applied to the link before it became overloaded, which would restore the probability of selecting the link. This technique allows for established SIP links between operators to be taken out of service and put back in to service without manual operator intervention based on the current link status.

The above scenarios describe techniques for operators to automatically add, remove, or update link information between communicating SIP servers across domains that have a mutual trust relationship. However, in some examples, additional security may be desired to prevent malicious applications from spoofing SIP INFO messages. These security measures could be achieved through encryption, security challenges, and other safeguards. For example, in response to a SIP INFO message, a SIP server could respond with a security challenge having a random number. The SIP server receiving the security challenge could process the random number with a hash algorithm shared between both operators to generate a security result to return to the challenging SIP server. The SIP server could then verify the security result and proceed to make the changes to the DNS server upon successful authentication.

By leveraging dynamic DNS and communicating SIP link status changes through the use of SIP INFO messages, SIP servers in communication across different domains can update corresponding DNS SRV records accordingly. This allows for link status changes to be immediately communicated between nodes, possibly over dedicated interfaces, and the corresponding DNS records automatically updated without manual operator intervention. The techniques described herein will also help prevent calls from being sent to overloaded or out-of-service links, thereby avoiding delays in establishing calls, call failures, and the need for SIP servers to quarantine such links after call failure.

Figure 5:
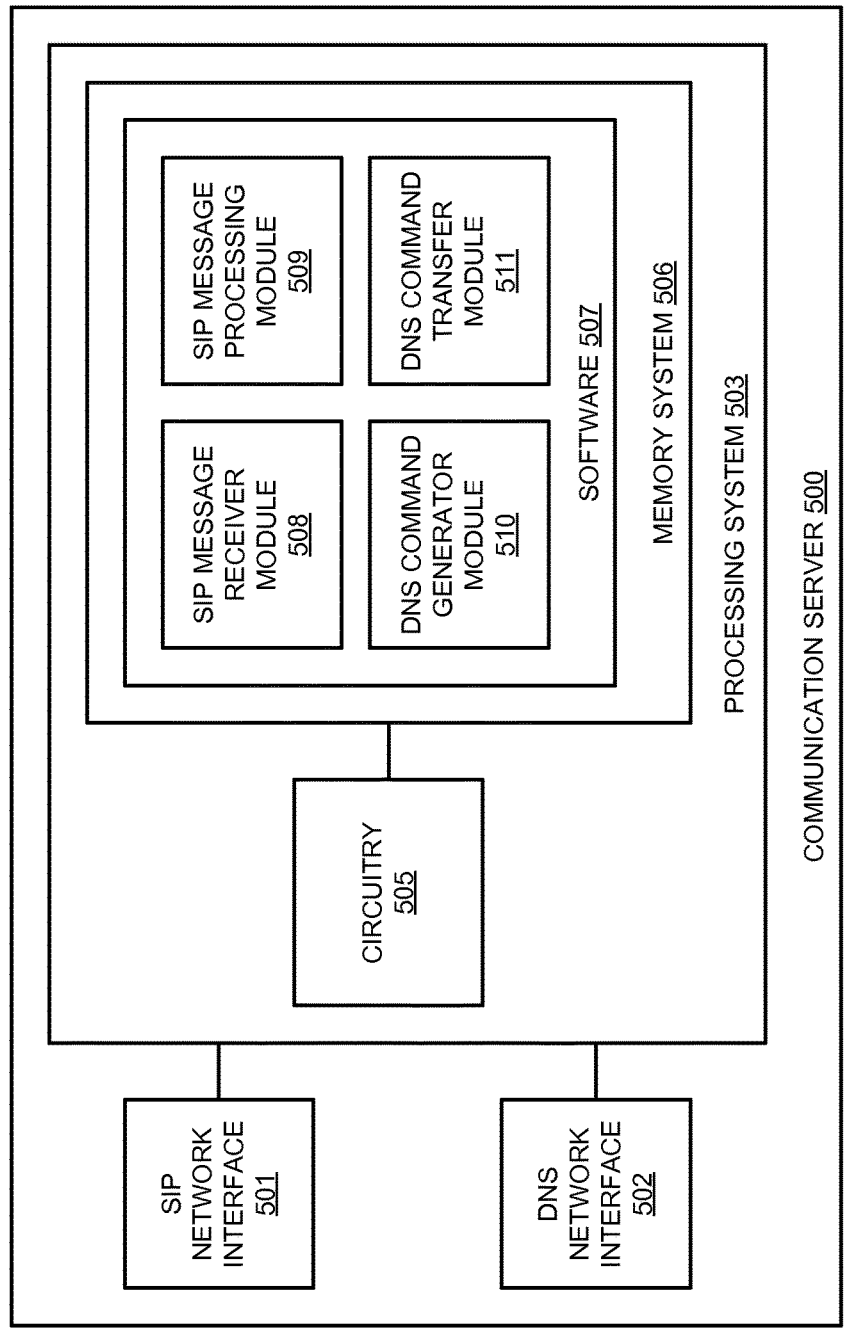
FIG. 5 is a block diagram that illustrates a communication server.

FIG. 5 is a block diagram that illustrates communication server 500. Communication server 500 provides an example of communication server 110, although server 110 may use alternative configurations. Communication server 500 comprises session initiation protocol (SIP) network interface 501, domain name system (DNS) network interface 502, and processing system 503. Processing system 503 is linked to SIP network interface 501 and DNS network interface 502. Processing system 503 includes processing circuitry 505 and memory system 506 that stores operating software 507. Operating software 507 comprises software modules 508-511.

SIP network interface 501 comprises components that communicate over communication links, such as network cards, ports, RF transceivers, processing circuitry and software, or some other communication components. SIP network interface 501 may be configured to communicate over metallic, wireless, or optical links. SIP network interface 501 may be configured to use TDM, IP, Ethernet, optical networking, wireless protocols, communication signaling, or some other communication format—including combinations thereof. SIP network interface 501 is configured to receive a SIP information message comprising a DNS modification indicator.

DNS network interface 502 comprises components that communicate over communication links, such as network cards, ports, RF transceivers, processing circuitry and software, or some other communication components. DNS network interface 502 may be configured to communicate over metallic, wireless, or optical links. DNS network interface 502 may be configured to use TDM, IP, Ethernet, optical networking, wireless protocols, communication signaling, or some other communication format—including combinations thereof. DNS network interface 502 is configured to transfer a DNS modification command for delivery to a DNS server.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for communication server 110. In particular, operating software 507 may direct processing system 503 to direct SIP network interface 501 to receive a SIP information message comprising a DNS modification indicator. Operating software 507 further directs processing system 503 to, responsive to the DNS modification indicator, process the SIP information message to identify DNS modification parameters in the SIP information message, and process the DNS modification parameters to generate a DNS modification command for a DNS server. Finally, operating software 507 may direct processing system 503 to direct DNS network interface 502 to transfer the DNS modification command for delivery to the DNS server.

In this example, operating software 507 comprises a SIP message receiver software module 508 that receives a SIP information message comprising a DNS modification indicator. Additionally, operating software 507 comprises a SIP message processing software module 509 that, responsive to the DNS modification indicator, processes the SIP information message to identify DNS modification parameters in the SIP information message. Further, operating software 507 also comprises a DNS command generator software module 510 that processes the DNS modification parameters to generate a DNS modification command for a DNS server. Finally, operating software 507 comprises a DNS command transfer software module 511 that transfers the DNS modification command for delivery to the DNS server.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication server to facilitate modification of records in a domain name system (DNS) server associated with a first domain, the method comprising:
receiving a session initiation protocol (SIP) information message transmitted from another communication server associated with a second domain comprising a DNS modification indicator;
responsive to the DNS modification indicator, processing the SIP information message to identify SIP trunk link modification parameters in the SIP information message;
processing the SIP trunk link modification parameters to generate a DNS modification command for the DNS server; and
transferring the DNS modification command for delivery to the DNS server associated with the first domain.

2. The method of claim 1 wherein the DNS server is configured to process the DNS modification command to modify at least one SIP trunk link record in the DNS server.

3. The method of claim 1 further comprising generating a second SIP information message comprising a DNS update for a second DNS server associated with the second domain.

4. The method of claim 1 wherein the SIP trunk link modification parameters are included in an extensible markup language (XML) body of the SIP information message.

5. The method of claim 1 wherein the SIP trunk link modification parameters comprise an internet protocol (IP) address of the SIP trunk link.

6. The method of claim 1 wherein the SIP trunk link modification parameters comprise a link priority.

7. A communication server to facilitate modification of records in a domain name system (DNS) server associated with a first domain, the communication server comprising:
a session initiation protocol (SIP) network transceiver coupled to a processor configured to receive a SIP information message transmitted from another communication server associated with a second domain comprising a DNS modification indicator;
the processor configured to, responsive to the DNS modification indicator, process the SIP information message to identify SIP trunk link modification parameters in the SIP information message, and process the SIP trunk link modification parameters to generate a DNS modification command for the DNS server; and
a DNS network transceiver configured to transfer the DNS modification command for delivery to the DNS server associated with a first domain.

8. The communication server of claim 7 wherein the DNS server is configured to process the DNS modification command to modify at least one SIP trunk link record in the DNS server.

9. The communication server of claim 7 wherein the processor is further configured to generate a second SIP information message comprising a DNS update for a second DNS server associated with the second domain.

10. The communication server of claim 7 wherein the SIP trunk link modification parameters are included in an extensible markup language (XML) body of the SIP information message.

11. The communication server of claim 7 wherein the SIP trunk link modification parameters comprise an internet protocol (IP) address of the SIP trunk link.

12. The communication server of claim 7 wherein the SIP trunk link modification parameters comprise a link priority.

13. A computer apparatus to facilitate modification of records in a domain name system (DNS) server associated with a first domain, the apparatus comprising:
software instructions configured, when executed by a communication server, to direct the communication server to receive a session initiation protocol (SIP) information message transmitted from another communication server associated with a second domain comprising a DNS modification indicator and, responsive to the DNS modification indicator, process the SIP information message to identify SIP trunk link modification parameters in the SIP information message;
the software instructions further configured to direct the communication server to process the SIP trunk link modification parameters to generate a DNS modification command for the DNS server, and transfer the DNS modification command for delivery to the DNS server associated with the first domain;
a processor and at least one non-transitory computer-readable storage medium storing the software instructions to operate the communication server, when read and executed by the processor.

14. The computer apparatus of claim 13 wherein the DNS server is configured to process the DNS modification command to modify at least one SIP trunk link record in the DNS server.

15. The computer apparatus of claim 13 wherein the software instructions are further configured to direct the communication server to generate a second SIP information message comprising a DNS update for a second DNS server associated with the second domain.

16. The computer apparatus of claim 13 wherein the SIP trunk link modification parameters are included in an extensible markup language (XML) body of the SIP information message.

17. The computer apparatus of claim 13 wherein the SIP trunk link modification parameters comprise an internet protocol (IP) address of the SIP trunk link.

* * * * *